United States Patent
Garthwaite et al.

(10) Patent No.: US 9,053,064 B2
(45) Date of Patent: Jun. 9, 2015

(54) METHOD FOR SAVING VIRTUAL MACHINE STATE TO A CHECKPOINT FILE

(71) Applicant: VMware, Inc., Palo Alto, CA (US)

(72) Inventors: Alexander Thomas Garthwaite, Beverly, MA (US); Yury Baskakov, Newton, MA (US); Irene Zhang, Seattle, WA (US); Kevin Scott Christopher, Sunnyvale, CA (US); Jesse Pool, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 172 days.

(21) Appl. No.: 13/710,185

(22) Filed: Dec. 10, 2012

(65) Prior Publication Data

US 2014/0164722 A1 Jun. 12, 2014

(51) Int. Cl.
*G06F 12/00* (2006.01)
*G06F 12/16* (2006.01)

(52) U.S. Cl.
CPC ..................................... *G06F 12/16* (2013.01)

(58) Field of Classification Search
None
See application file for complete search history.

(56) References Cited

U.S. PATENT DOCUMENTS

| | | | | |
|---|---|---|---|---|
| 5,909,553 A * | 6/1999 | Campbell et al. | ............. | 709/236 |
| 6,016,503 A * | 1/2000 | Overby et al. | ................ | 718/104 |
| 6,112,265 A * | 8/2000 | Harriman et al. | ............. | 711/151 |
| 6,718,538 B1 * | 4/2004 | Mathiske | ...................... | 717/129 |
| 6,795,966 B1 | 9/2004 | Lim et al. | | |
| 6,879,266 B1 * | 4/2005 | Dye et al. | ......................... | 341/51 |
| 7,397,959 B1 * | 7/2008 | Volkoff et al. | ................ | 382/233 |
| 7,478,278 B2 * | 1/2009 | Archer et al. | .................... | 714/15 |
| 7,716,249 B2 * | 5/2010 | Harris et al. | ................... | 711/145 |
| 8,250,033 B1 * | 8/2012 | De Souter et al. | ............ | 707/637 |
| 2002/0066007 A1 * | 5/2002 | Wise et al. | ..................... | 712/300 |
| 2004/0268332 A1 * | 12/2004 | Mitsumori et al. | ........... | 717/154 |
| 2006/0143350 A1 * | 6/2006 | Miloushev et al. | ........... | 710/242 |
| 2007/0096954 A1 * | 5/2007 | Boldt et al. | ...................... | 341/50 |
| 2007/0156986 A1 * | 7/2007 | Neiger et al. | ................ | 711/163 |
| 2009/0031310 A1 * | 1/2009 | Lev et al. | ...................... | 718/101 |
| 2010/0070677 A1 * | 3/2010 | Thakkar | ........................... | 711/6 |
| 2010/0070678 A1 * | 3/2010 | Zhang et al. | ..................... | 711/6 |
| 2010/0281208 A1 * | 11/2010 | Yang | ............................. | 711/103 |
| 2011/0302577 A1 * | 12/2011 | Reuther et al. | ................... | 718/1 |
| 2012/0011504 A1 | 1/2012 | Ahmad et al. | | |
| 2012/0017027 A1 | 1/2012 | Baskakov et al. | | |
| 2013/0007735 A1 * | 1/2013 | Bookman et al. | ................. | 718/1 |
| 2013/0198334 A1 * | 8/2013 | Ikenaga et al. | ................ | 709/217 |
| 2014/0164723 A1 * | 6/2014 | Garthwaite et al. | .......... | 711/162 |

OTHER PUBLICATIONS

Plank et al. "Compressed Differences: An Algorithm for Fast Incremental Checkpointing." U. of Tenn. Technical Report CS-95-302, Aug. 1995.*
U.S. Appl. No. 12/938,107, filed Nov. 2, 2010, entitled "Exporting Guest Spatial Locality to Hypervisors".

* cited by examiner

*Primary Examiner* — Daniel Bernard

(57) ABSTRACT

A process for lazy checkpointing a virtual machine is enhanced to reduce the number of read/write accesses to the checkpoint file and thereby speed up the checkpointing process. The process for saving a state of a virtual machine running in a physical machine to a checkpoint file maintained in persistent storage includes the steps of copying contents of a block of memory pages, which may be compressed, into a staging buffer, determining after the copying if the buffer is full, and upon determining that the buffer is full, saving the buffer contents in a storage block of the checkpoint file.

22 Claims, 8 Drawing Sheets

METHOD FOR SAVING VIRTUAL MACHINE STATE TO A CHECKPOINT FILE

BACKGROUND

A checkpoint is a point in virtual machine (VM) execution where the VM state is consistent. It occurs at instruction boundaries with no in-flight device input/output operations (IOs). The ability to save and restore the state of a running VM at a checkpoint, also referred to as checkpointing, is a key feature provided by virtualization. U.S. Pat. No. 6,795,966, incorporated by reference herein in its entirety, describes the checkpoint process for a VM in detail.

For large VMs, both the checkpoint save process and the checkpoint restore process can take a very long time. In order to reduce the downtime during checkpoint save and speed up checkpoint restore, a checkpoint process may be carried out in a manner that allows the VM state to be saved or restored "lazily." Lazy checkpointing minimizes the time that the VM is not running, by either writing out or reading in its state while the VM is executing instructions. When lazy checkpointing is implemented, write traces are installed on each page of VM memory. When the VM writes to a traced page, the write trace is removed and the contents of the page are written out to a checkpoint file before the page is modified with the write. During a lazy checkpoint restore process, the VM is allowed to start running even before its entire state has been loaded into memory from the checkpoint file. As the VM executes instructions that generate accesses to memory, the pages that are not in memory are faulted in from the checkpoint file.

Some checkpoint techniques either track accesses by the VM or use existing data structures like page tables to discern likely temporal locality. Based on this information, the checkpointed state of the VM is reorganized to preserve this temporal locality. Mappings are also maintained in storage to allow the checkpointed state to be restored to the proper locations in memory. Other checkpointing techniques employ compression to minimize the number of disk blocks that need to be written out or read in during the checkpoint process.

SUMMARY

Disclosed herein are techniques to employ lazy checkpointing in combination with one or more enhancements that reduce the number of read/write accesses to the checkpoint file and disk thrashing in the case of rotating disks, and speed up the checkpointing process. In one embodiment, lazy checkpointing is performed with improved temporal locality. In another embodiment, lazy checkpointing is performed with improved temporal locality and compression.

A method of saving a state of a virtual machine running in a physical machine, according to an embodiment of the invention, includes the steps of detecting access to a memory page of the virtual machine, wherein the access may be access for a read or write, copying contents of a block of memory pages including the memory page into a buffer prior to the access, determining after the copying if the buffer contains a predetermined number of blocks of memory pages of at least two, and upon determining that the buffer contains the predetermined number of blocks of memory pages, saving the contents of the blocks of memory pages in the buffer in a storage block of a checkpoint file that is maintained in persistent storage.

A method of saving a state of a virtual machine running in a physical machine, according to another embodiment of the invention, includes the steps of selecting a block of memory pages according to settings of accessed bits in guest pages tables of the virtual machine, copying contents of the block of memory pages into a buffer, determining after the copying if the buffer contains a predetermined number of blocks of memory pages of at least two, and upon determining that the buffer contains the predetermined number of blocks of memory pages, saving the contents of the blocks of memory pages in the buffer in a storage block of a checkpoint file that is maintained in persistent storage.

A method of saving a state of a virtual machine running in a physical machine, according to still another embodiment of the invention, includes the steps of compressing a block of memory pages, copying compressed contents of the block of memory pages into a buffer, and saving the compressed contents of the block of memory pages in the buffer and metadata information associated with the compressed contents that indicate a size of the compressed contents and a unique identifier for the block of memory pages, in a storage block of a checkpoint file that is maintained in persistent storage.

Further embodiments of the present invention include a non-transitory computer-readable storage medium comprising instructions that cause a computer system to carry out one more of the above methods as well as a computer system configured to carry out one or more of the above methods.

DETAILED DESCRIPTION

Figure 1:
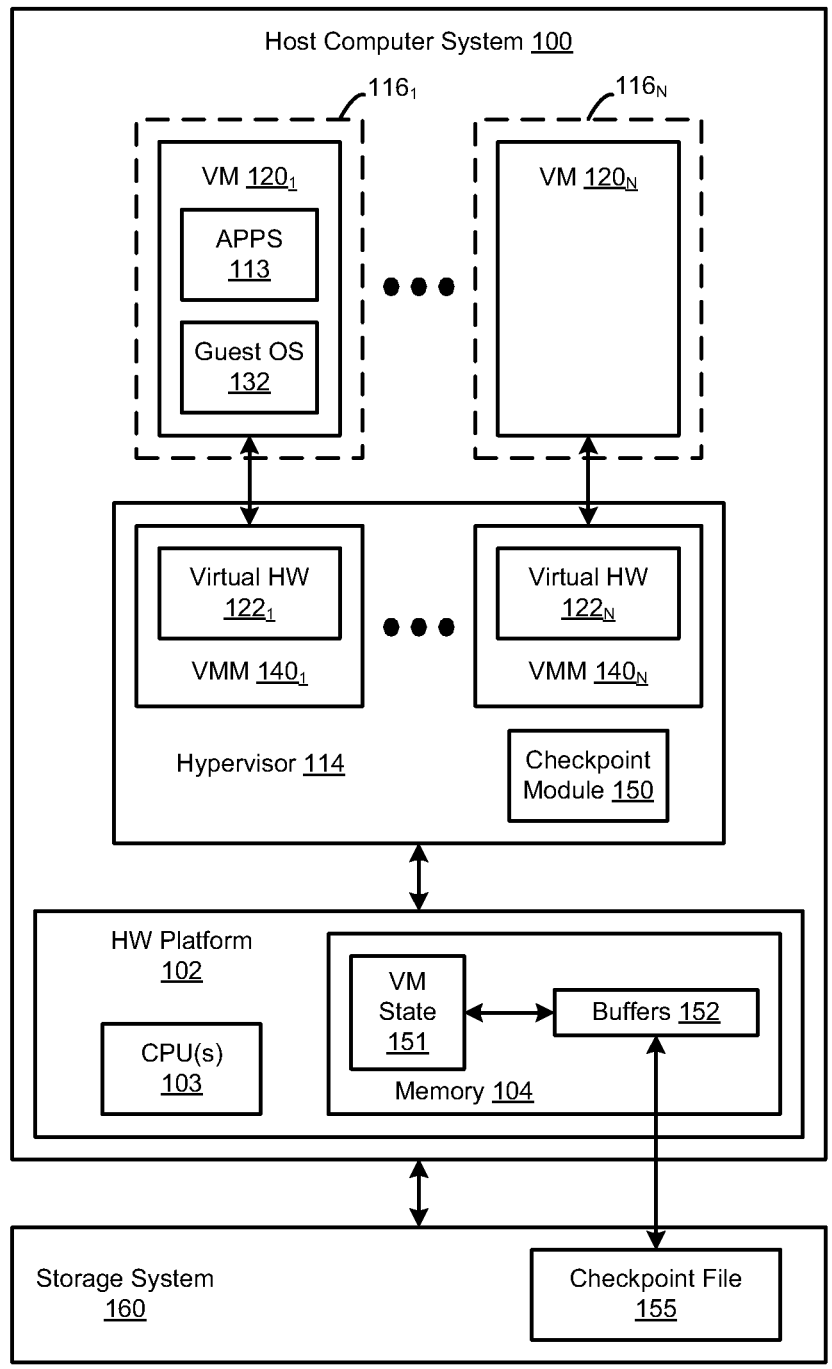
FIG. 1 is a block diagram of a virtualized computer system that is configured to generate a checkpoint and restore from a checkpoint according to one or more embodiments of the invention.

FIG. 1 is a block diagram of a virtualized computer system that is configured to generate a checkpoint and restore from a checkpoint according to one or more embodiments of the invention. Host computer system 100 may be constructed on a desktop, laptop or server grade hardware platform 102, such as an x86 architecture platform. Hardware platform 102 includes one or more central processing units (CPUs) 103, host physical memory 104 (also referred to as "machine memory"), and other standard hardware components (not shown). A hypervisor 114 is installed on top of hardware platform 102. Hypervisor 114 supports multiple virtual machine execution spaces $116_1$-$116_N$, within each of which a VM process may be executed to instantiate corresponding VMs $120_1$-$120_N$. For each of VMs $120_1$-$120_N$, hypervisor 114 manages a corresponding virtual hardware platform (i.e., virtual hardware platforms $122_1$-$122_N$) that includes emulated hardware such as virtual CPUs (vCPUs) and guest physical memory. Each virtual hardware platform 122 supports the installation of a guest operating system (OS) (e.g., guest OS 132). In each instance, the guest OS provides user-level applications running in the virtual machine, e.g., APPS 113, an interface to the virtual hardware platform of the virtual machine.

A checkpoint module 150 is provided in hypervisor 114 to manage the saving and restoring of checkpoints for each of VMs $120_1$-$120_N$. When a particular VM undergoes a checkpoint save process, checkpoint module 150 directs the state of the VM, shown in FIG. 1 as VM state 151, to be saved into a checkpoint file 155 that is maintained in persistent storage, e.g., storage system 160. Buffers 152 are used as staging areas for saving VM state 151 in checkpoint file 155. When a VM is restored from a checkpoint, the contents of checkpoint file 155 are loaded into memory 104 and VM state 151 is restored therefrom. Buffers 152 are used as staging areas for restoring VM state 151 from checkpoint file 155. Buffers 152 are pre-allocated and, in one embodiment, the number of buffers 152 that are pre-allocated is equal to the number of vCPUs in the VM plus N (equal to the number of background threads, typically one or two). The number of buffers can be increased, in some embodiments dynamically allocated, to allow checkpoint save and restore processes to continue executing even though they are waiting for a buffer to free up. The number of buffers can be decreased if a locking mechanism is implemented to coordinate sharing of buffers by different vCPUs or background threads.

It should be recognized that the various terms, layers and categorizations used to describe the virtualization components in FIG. 1 may be referred to differently without departing from their functionality or the spirit or scope of the invention. For example, virtual hardware platforms $122_1$-$122_N$ may be considered to be part of virtual machine monitors (VMM) $140_1$-$140_N$ which implement the virtual system support needed to coordinate operations between hypervisor 114 and their respective VMs. Alternatively, virtual hardware platforms $122_1$-$122_N$ may also be considered to be separate (e.g., as a component of its corresponding virtual machine since such platforms include the hardware emulation components for the virtual machine) from VMMs $140_1$-$140_N$, and VMMs $140_1$-$140_N$ may be considered to be separate from hypervisor 114. One example of hypervisor 114 that may be used is included as a component of VMware's vSphere product, which is commercially available from VMware, Inc. of Palo Alto, Calif. It should further be recognized that other virtualized computer systems are contemplated, such as hosted virtual machine systems, where the hypervisor is implemented in conjunction with a host operating system.

Figure 2A:
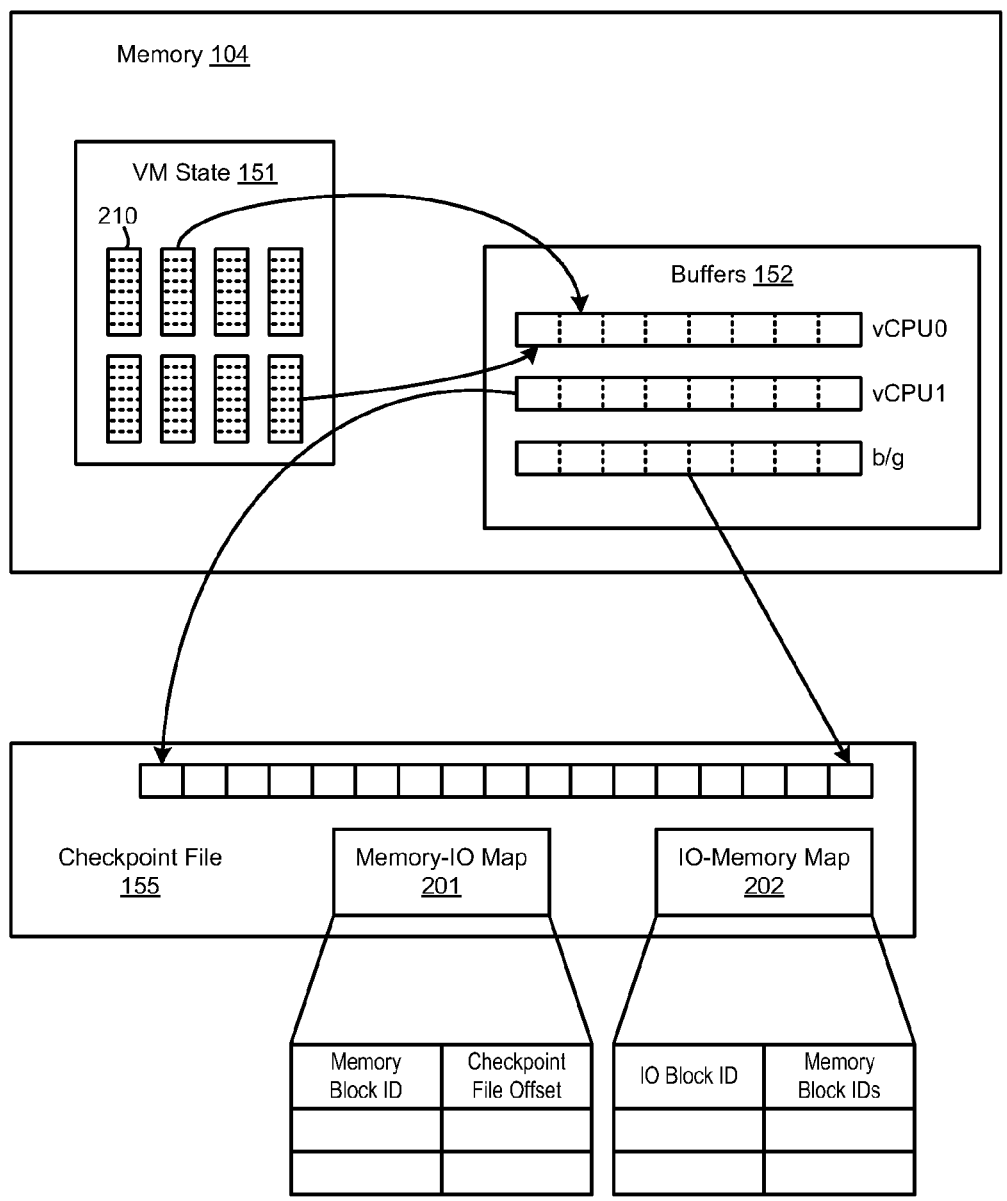
FIG. 2A is a conceptual diagram that illustrates a checkpoint save process according to an embodiment of the invention.
Figure 2B:
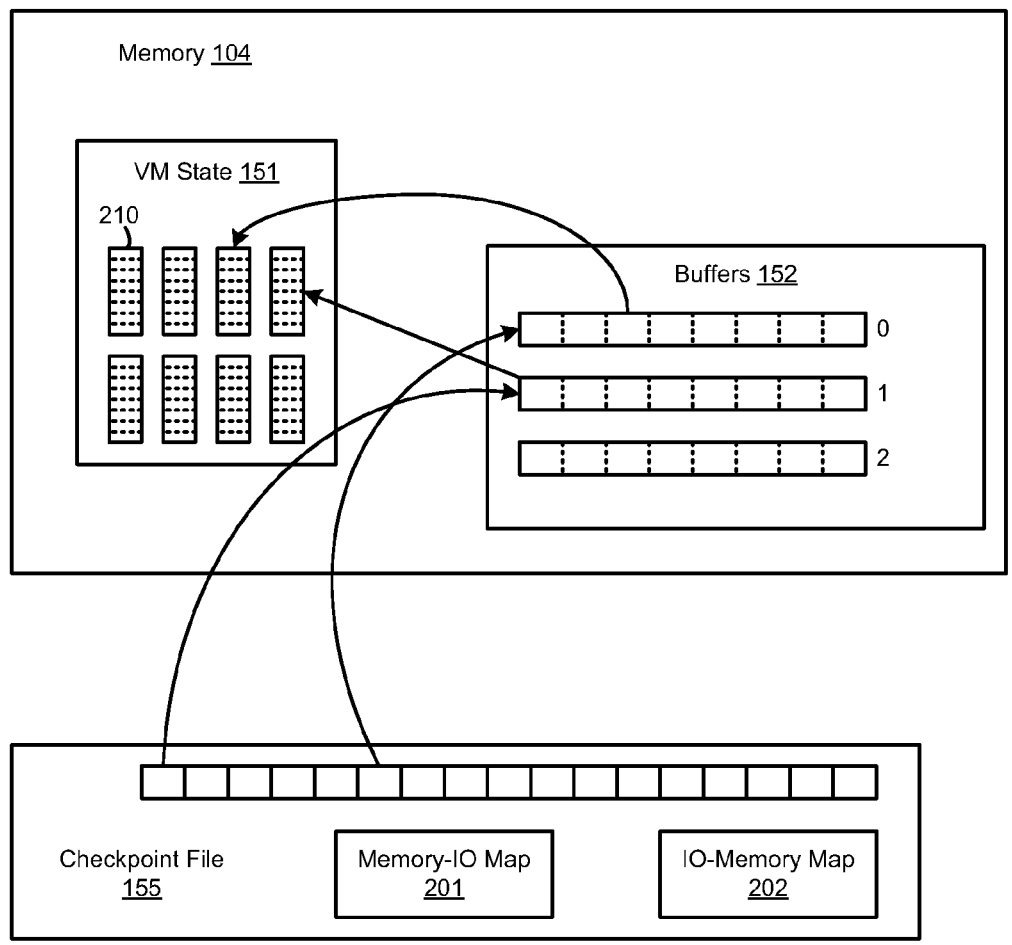
FIG. 2B is a conceptual diagram that illustrates a checkpoint restore process according to an embodiment of the invention.

FIG. 2A is a conceptual diagram that illustrates a checkpoint save process according to an embodiment of the invention, which may be performed in connection with a VM snapshot or suspend operation. During the checkpoint save process, VM state 151 is first copied into buffers 152 and then the buffer contents are copied into checkpoint file 155, which is shown in the embodiment of FIGS. 2A and 2B as a single file, but in alternative embodiments, may be multiple files. In the embodiment described herein, VM state 151 is copied into buffers 152 in units of memory blocks, where each memory block contains a set of 8 contiguous 4 KB pages in the VM's physical memory. Other embodiments may implement a different memory block size and/or a different page size, e.g., a set of 4 contiguous 32 KB pages in one memory block. By way of example, eight memory blocks are illustrated in FIG. 2A with one of them labeled 210. Also, in the embodiment described herein, contents of buffers 152 are copied into checkpoint file 155 in units of IO blocks, where each IO block contains a set of 8 memory blocks. Other embodiments may implement a different IO block size. Memory-IO map 201 and IO-memory map 202 represent data structures that are populated during the checkpoint save process and used during checkpoint restore process. As shown in FIG. 2A, memory-IO map 201 is an array of checkpoint file offsets indexed by memory block ID, and IO-memory map 202 is an array of sets of memory block IDs indexed by IO block ID where each set contains, in order, the IDs of memory blocks forming the IO block. It should be recognized that the IDs of memory blocks forming the IO block need not be stored in a standalone data structure such as IO-memory map 202 but can be stored within the IO block itself.

Each virtual CPU of a VM (e.g., vCPU0 or vCPU1) is assigned one of buffers 152 and executes a thread that manages copying of memory blocks in VM state 151 into its corresponding buffer. In one embodiment, the buffer has a size that is the same as the size of IO blocks, i.e., to contain 8 memory blocks. When the buffer becomes full, the virtual CPU copies the buffer contents to a next available IO block of checkpoint file 155 and frees the buffer for additional memory blocks to be copied in. A background thread is executed in parallel to the vCPU threads to copy memory blocks into one of the buffers, and then save the buffer contents into checkpoint file 155 when the buffer becomes full. Given additional information about how likely pages are to be accessed, e.g., by the techniques disclosed in U.S. patent application Ser. No. 12/834,662, filed on Jul. 12, 2010 and entitled "Online Classification of Memory Pages Based on Activity Level," which is incorporated by reference herein in its entirety, the background thread may initially focus on memory blocks that include pages which are less likely to be accessed. In addition, the contents saved into checkpoint file 155 by the background thread may be written to a different part of checkpoint file 155. In one embodiment, the vCPU threads copy the buffer contents into a first available IO block at a first part of checkpoint file 155, and the background thread copies the buffer contents into a first available IO block at a second part of checkpoint file 155. For example, the first and second parts of checkpoint file 155 may be at different ends of checkpoint file 155 or different sections of checkpoint file 155, or in embodiments with multiple checkpoint files, different checkpoint files. FIG. 2A shows, by way of example, the vCPU1 thread saving its buffer contents into the very first IO block and the background thread saving its buffer contents into the very last IO block.

FIG. 2B is a conceptual diagram that illustrates a checkpoint restore process according to an embodiment of the invention, which may occur during a VM snapshot restore operation or a VM resume operation. During this checkpoint restore process, contents of checkpoint file 155 are first copied into buffers 152 on a per IO block basis and then portions of VM state 151 are restored from the buffer contents on a per memory block basis. Both memory-IO map 201 and IO-memory map 202 are used during the checkpoint restore process to identify locations of the VM's physical memory into which contents copied from checkpoint file 155 into buffers 152 should be loaded.

The assignment of buffers 152 during the checkpoint restore process is different from that during the checkpoint save process. Here, buffers 152 are organized as a pool and assigned from the pool to hold contents of IO blocks on demand. As vCPUs access memory pages, they identify via memory-IO map 201 and a metadata for buffers 152 (which describe whether any of buffers 152 contain an IO block with unprocessed memory blocks and identify such IO block or blocks) if the requisite IO block already exists in one of buffers 152. If the requisite IO block does not exist in one of buffers 152, the vCPU selects a buffer from the pool and loads the contents of the IO block into the buffer. After loading the contents of the IO block into the buffer, the vCPU may completely process the IO block, or simply process the memory block that contains the memory pages being accessed. The background thread may complete the processing of IO blocks in any of buffers 152 and also may read in additional IO blocks from checkpoint file 155, preferentially from IO blocks that are likely to be accessed later by vCPUs (in one embodiment, starting from the part of checkpoint file 155 to which vCPU threads copied the buffer contents during the save process).

Figure 3:
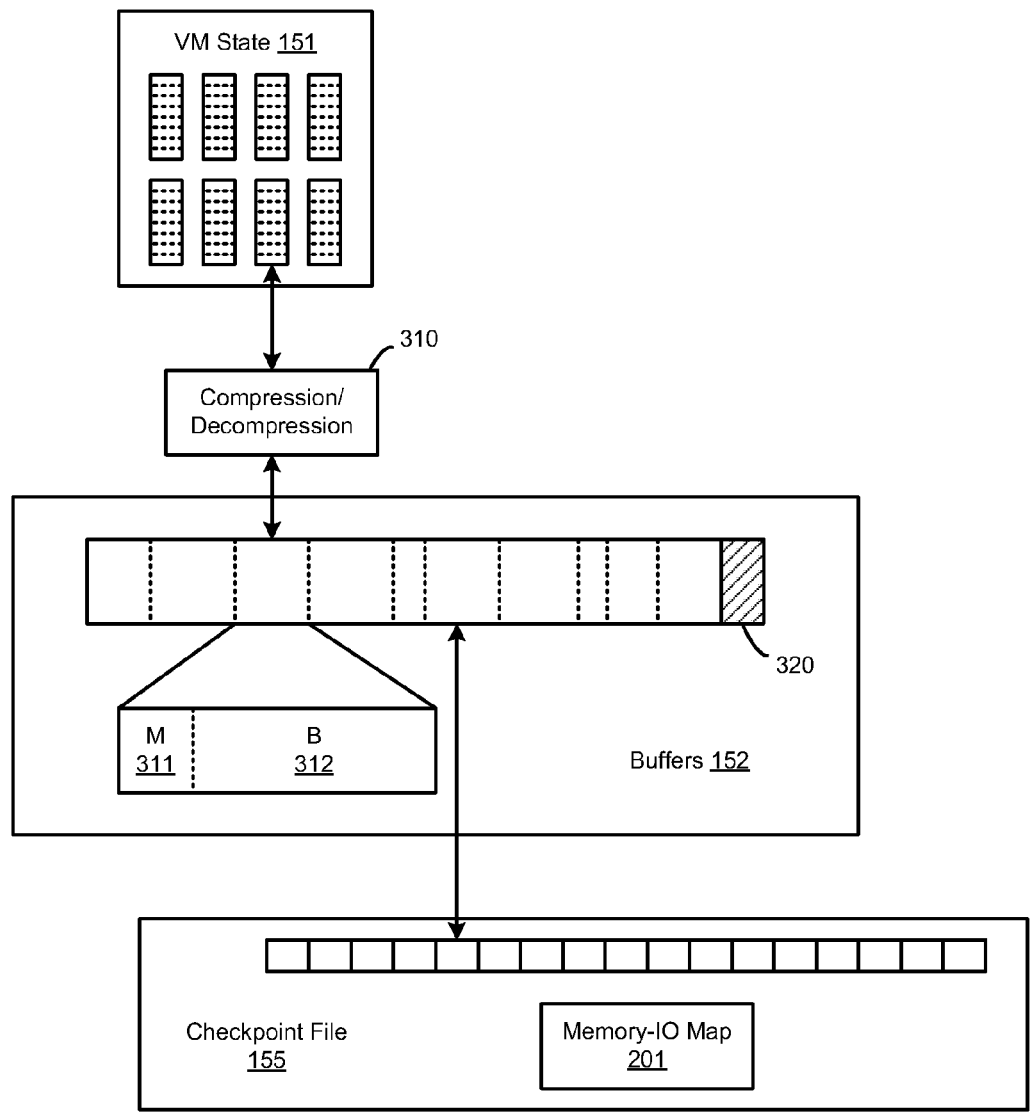
FIG. 3 is a conceptual diagram that illustrates a checkpoint save and restore process according to another embodiment of the invention.

FIG. 3 is a conceptual diagram that illustrates a checkpoint save and restore process according to another embodiment of the invention. This process permits the contents of checkpoint file 155 to be compressed so that the number of IOs is reduced and less storage capacity is used by checkpoint file 155. The process employs buffers 152 in the same manner as the checkpoint save and restore processes described above, but the contents of each memory block stored therein include a metadata portion (M 311) and a compressed body portion (B 312). The metadata portion contains the memory block ID and the length of the compressed body portion, and may be stored at the head of the body portion as shown in FIG. 3 or even in a data structure separate from checkpoint file 155. A compression/decompression module 310 is provided to compress the contents of the memory block prior to writing them in one of buffers 152 and to decompress the compressed body portion of the memory block prior to loading them into the VM's physical memory.

It should be recognized that compression/decompression module 310 may implement any technically feasible data compression software and associated algorithms, including data compression software known as zlib, as well as up-front encoding optimizations that are based on whether pages have been accessed at all or whether they contain known contents, such as described in U.S. patent application Ser. No. 12/834,962, filed Jul. 13, 2010 and entitled "Method for Improving Save and Restore Performance in Virtual Machine Systems," the entire contents of which are incorporated by reference herein. It should also be recognized that the sizes of memory blocks stored in buffers 152 vary because of the compression. As a result, an unused portion 320 is likely to be present at the end of a buffer, and the beginning of any one of the memory blocks within an IO block, other than the first one, cannot be derived. Therefore, IO-memory map 202 is not used by the background thread in this embodiment. Instead, when the background thread selects an IO block from checkpoint file 155 during restoration, it relies on the metadata information contained in the IO block to determine the IDs of memory blocks being restored. In addition, the size of the compressed body portion is obtained from the metadata information so that compression/decompression module 310 will know the size of the data to be read and decompressed.

Figure 4:
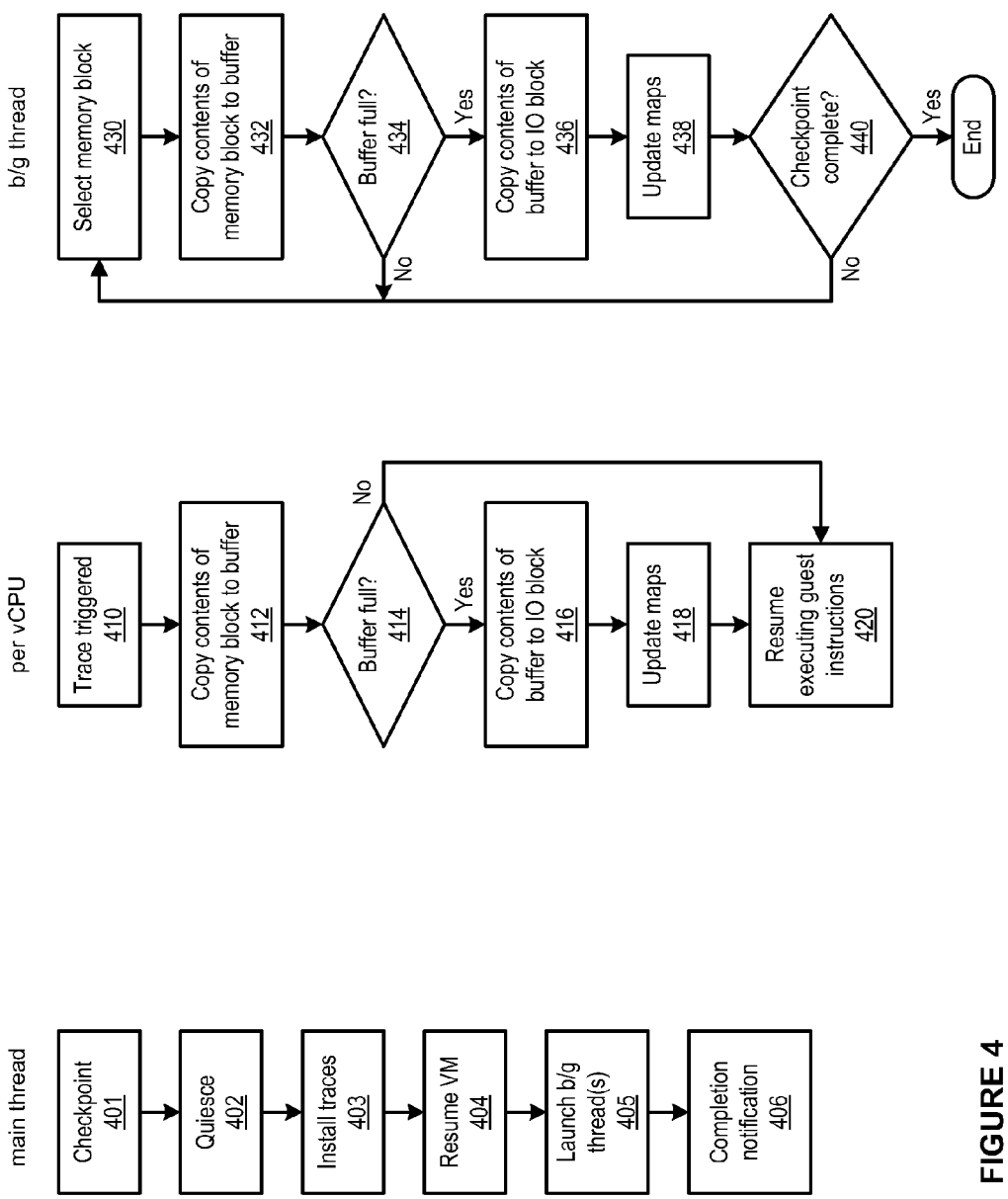
FIG. 4 depicts flow diagrams of processes executed during a checkpoint save process according to an embodiment of the invention.

FIG. 4 depicts flow diagrams of processes executed during a checkpoint save process according to an embodiment of the invention. A lazy checkpoint save process, which allows the VM to continue running during this process, is illustrated herein. Steps 401-406 represent steps of a main checkpoint thread executed within checkpoint module 150. Steps 410, 412, 414, 416, 418, and 420 represent steps of checkpoint save thread executed per vCPU. Steps 430, 432, 434, 436, 438, and 440 represent steps of a background checkpoint save thread running in parallel with the per vCPU threads. The description provided herein covers the execution of only one background thread but it should be understood that more than one background thread may be executed in parallel.

At step 401, a checkpoint is declared either programmatically according to a timer event or some other event, or by a user input. Before the VM state is written out to the checkpoint file, the VM state is quiesced (step 402). This means all vCPUs are stopped and all pending IOs are allowed to complete. Then, at step 403, access traces are installed on each memory page of the VM. In one embodiment, the present bit of each memory page of the VM is cleared so that any subsequent access, whether for read or write, will trigger a fault. In another embodiment, write traces are installed so that a write to the traced memory page will trigger a fault, but not a read. After the access traces have been installed, the VM is resumed at step 404. While the vCPUs of the VM are running, one or more background threads are launched at step 405. When the checkpoint save process is complete as determined by background thread at step 440, the main thread at step 406 stops execution of all checkpoint save threads and issues a notification that the checkpoint save process has been completed.

Each of the vCPUs begins execution of a checkpoint save thread at step 410 when a memory page is accessed (e.g., in connection with a read or write in one embodiment, or a write but not a read in another embodiment) by the corresponding vCPU and the access trace installed on that memory page is triggered. Prior to the access, the memory block containing the memory page to be written is identified and the entire contents of the memory block are copied into a buffer that has been assigned to the vCPU (step 412). In some embodiments, the buffer has a size that is at least two times greater than a size of the memory block. This buffer is checked at step 414 to see if it is full. If it is not, the vCPU at step 420 resumes execution of guest instructions. If the buffer is full, on the other hand, step 416 is executed. At step 416, the contents of the buffer are copied into an IO block of checkpoint file 155. Then, at step 418, memory-IO map 201 and IO-memory map 202 are updated with new entries. For example, if contents of memory blocks MB1 and MB2 were copied in that order into the buffer and subsequently the contents of the buffer were copied into IO block, DBX, memory-IO map 201 is updated with two new entries: <MB1, offset> and <MB2, offset> (where offset=checkpoint file offset of DBX), and IO-memory 202 is updated with a single new entry: <DBX, MB1, MB2>. After step 418, the vCPU resumes execution of guest instructions (step 420).

In contrast to the checkpoint save threads executed by the vCPUs, the background thread does not need to wait for a trigger and may begin right away depending on the load of the physical machine hosting the virtual machine. In one embodiment, the rate at which the vCPUs are saving out memory blocks is examined and when it drops below some threshold, the background thread begins depending on the load of the physical machine hosting the virtual machine. As a result, the background threads do not compete for bandwidth when vCPUs are productive and allows the VCPU activity to better capture temporal locality among memory blocks without such interference. At step 430, the background thread selects a memory block to be saved into checkpoint file 155. The memory block that is least likely to be accessed among those memory blocks whose contents have not yet been saved into checkpoint file 155, is selected. In one embodiment, the likelihood of access is determined according to techniques disclosed in U.S. patent application Ser. No. 12/834,662. In another embodiment, the likelihood of access is determined by examining accessed bits of guest page tables and the memory block having the least number of pages with accessed bits set is selected at step 430.

At step 432, the contents of the selected memory block are copied into the buffer assigned to this background thread. This buffer is checked at step 434 to see if it is full. If it is not, the flow returns to step 430, where another, unprocessed memory block is selected. If the buffer is full, on the other hand, step 436 is executed. At step 436, the contents of the buffer are copied into an IO block of checkpoint file 155. Then, at step 438, memory-IO map 201 and IO-memory map 202 are updated with new entries in the same manner as step 418.

After step 438, the background thread checks to see if the checkpoint save process has completed by checking to see if all memory blocks of the VM have been saved into checkpoint file 155. If so, the main thread is notified, as a result of which execution of all checkpoint save threads are stopped. If there still remains memory blocks of the VM that have not yet been processed, the flow returns to step 430, where another, unprocessed memory block is selected.

It should be recognized that the checkpoint save process described above allows the memory state of the VM to be written out in an order that captures the temporal locality of accesses among the pages being accessed. The memory blocks that are processed by the vCPU threads in the order they were accessed are saved to a first part of checkpoint file 155 as described above while the background thread that processes memory blocks that are less likely to be accessed are saved to a second part of checkpoint file 155 as described above. As a result, checkpoint file 155 becomes arranged in an order that reflects the temporal locality of accesses to the VM's physical memory. Accordingly, during a lazy checkpoint restore process, a background thread processes checkpoint file 155 beginning with the first part so that memory pages that are more likely to be accessed are fetched into memory before those that are less likely to be accessed.

When suspension is used to save the checkpoint, the checkpoint is not being saved lazily and traces are not used. However, the checkpoint can still be restored lazily. Therefore, as a way to preserve temporal locality of memory blocks saved into checkpoint file 155 in such situations, accessed bits of the VM's guest page tables may be used to guide what blocks of memory pages should be selected first for saving into checkpoint file 155. In addition, the techniques disclosed in U.S. patent application Ser. No. 12/938,107, filed Nov. 2, 2010 and entitled "Exporting Guest Spatial Locality to Hypervisors," which is incorporated by reference herein in its entirety, may be applied to further guide what blocks of memory pages should be selected first for saving into checkpoint file 155. In another embodiment, a linear scan is made through the VM's guest page tables and, as the linear scan is being made, the contents of any block of memory pages having at least M memory pages accessed (where M is one or more) would be saved into checkpoint file 155 via one of the staging buffers.

Figure 5:
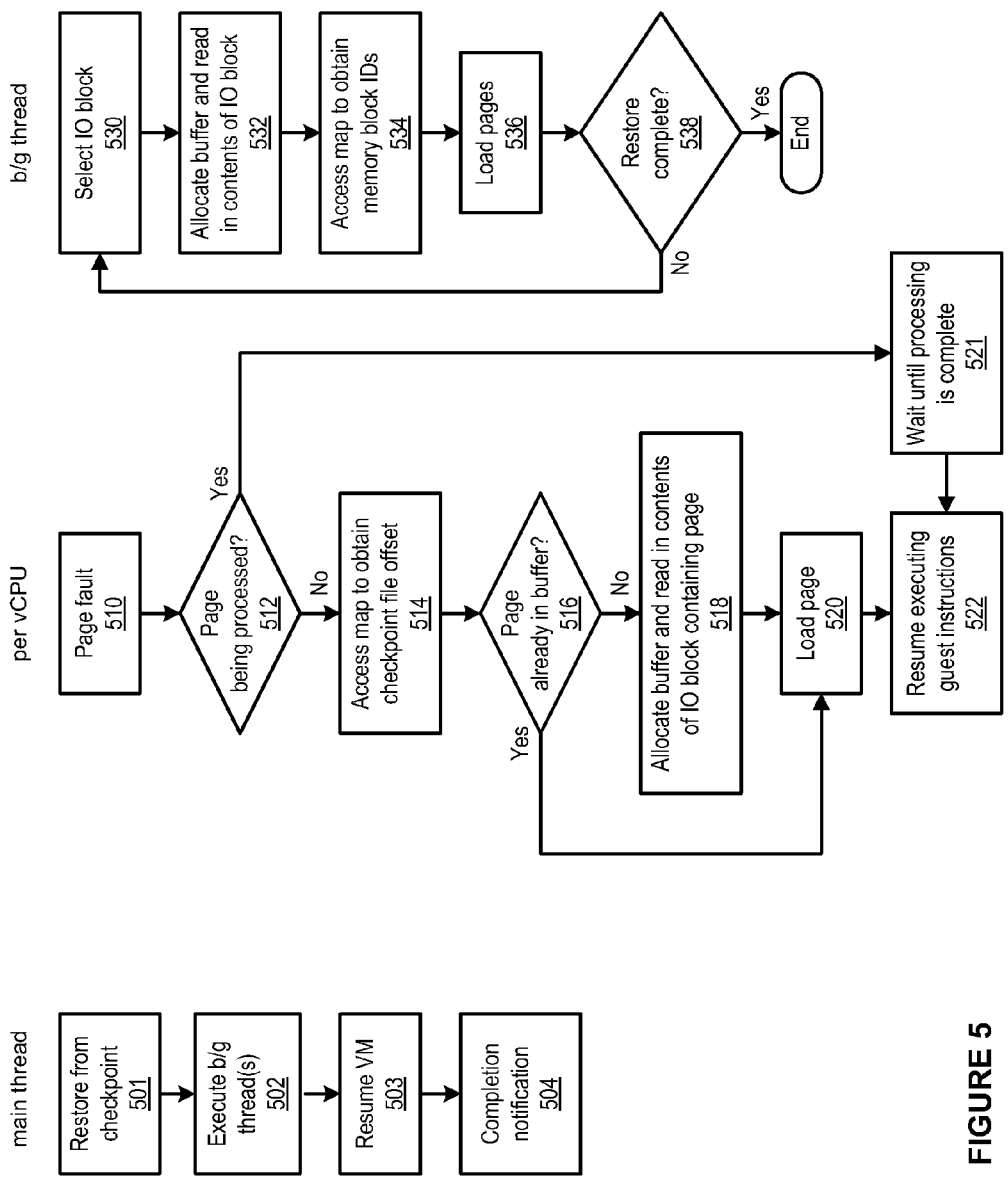
FIG. 5 depicts flow diagrams of processes executed during a checkpoint restore process according to an embodiment of the invention.

FIG. 5 depicts flow diagrams of processes executed during a checkpoint restore process according to an embodiment of the invention. A lazy checkpoint restore process, which allows the VM to resume from its checkpoint even though its entire state has not been loaded into memory, is illustrated herein. Steps 501-504 represent steps of a main checkpoint thread executed within checkpoint module 150. Steps 510, 512, 514, 516, 518, 520, and 522 represent steps of checkpoint restore thread executed per vCPU. Steps 530, 532, 534, 536, and 538 represent steps of a background thread running in parallel with the per vCPU threads. The description provided herein covers the execution of only one background thread but it should be understood that more than one background thread may be executed in parallel.

At step 501, a restore from checkpoint is declared either programmatically or by a user input. One or more background threads are launched at step 502. The checkpoint restore threads executed on the vCPU are not executed until a page fault is triggered because a memory page that has not been restored into VM's physical memory is accessed, but the background threads are allowed to execute right away. At step 503, while the background threads launched at step 502 are running, the VM execution is resumed. When the checkpoint restore process is complete as determined by background thread at step 538, the main thread at step 504 stops execution of all checkpoint restore threads and issues a notification that the checkpoint restore process has been completed.

Each of the vCPUs begins execution of the checkpoint restore thread at step 510 when a memory page that has not been loaded into VM's physical memory, is accessed by the corresponding vCPU and a page fault is triggered. At step 512, the metadata for buffers 152 is examined to see if the accessed memory page is being processed, e.g., already copied into one of buffers 152 from checkpoint file 155 and being processed by another vCPU thread or background thread for loading into memory. If the memory page is being processed, the vCPU at step 521 waits until the processing of that memory page is complete prior to proceeding to step 522, at which the vCPU resumes executing guest instructions. If the memory page is not being processed, on the other hand, step 514 is executed. At step 514, memory-IO map 201 is accessed to obtain a checkpoint file offset of the IO block associated with a memory block that includes the accessed memory page. At step 516, the metadata for buffers 152 is examined to see if the contents of the IO block have already been copied into one of buffers 152. If the contents of the IO block have not been copied into one of buffers 152, step 518 is executed, where one of buffers 152 is assigned to the vCPU and the contents of the IO block are copied into this buffer using the offset information stored in memory-IO map 201. Then, the contents of the particular memory block containing the accessed memory page are loaded into the VM's physical memory using IO-memory map 202 (step 520). For example, if memory-IO map 201 had two entries: <MB1, offset> and <MB2, offset> (where offset=checkpoint file offset of DBX), and a memory page inside MB2 is accessed, the DBX IO block is copied from checkpoint file 155 to the buffer using the checkpoint file offset of DBX, offset. Then, IO-memory map 202 is accessed to determine the order of the MB2 memory block within the DBX IO block so that the contents of the MB2 memory block can be loaded into the VM's physical memory. In one example, if memory pages of the memory block, MB2, are mapped to machine pages M1-M8, the contents are loaded into M1-M8. It should be noted that, after the contents of the particular memory block containing the accessed memory page have been loaded into the VM's physical memory, the memory blocks in the buffer not yet processed, may be loaded into the VM's physical memory by a background thread. Returning to step 516, if the contents of the IO block have already been copied into one of buffers 152, step 518 is skipped and step 520 is executed as described above.

In contrast to the checkpoint restore threads executed by the vCPUs, the background thread does not need to wait for a trigger and may begin right away depending on the load of the physical machine hosting the VM. At step 530, background thread selects an IO block that has not yet been fetched from checkpoint file 155 to be copied into one of buffers 152. The selection of the IO block is made from the first part of checkpoint file 155 for reasons described above. At step 532, one of buffers 152 is assigned from a pool of available buffers and the contents of the selected IO block are copied into this buffer. Then, at step 534, IO-memory map 202 is accessed to identify the memory blocks that are contained in the selected IO block. At step 536, these memory blocks are processed one by one in the order they are arranged within the IO block and the memory pages in each memory block are read into their corresponding locations in the VM's physical memory. After step 536, the background thread checks to see if the checkpoint restore process has completed by checking to see if all IO blocks have been fetched from checkpoint file 155 and all the memory blocks in buffers 152 have been processed. If so, the main thread is notified, as a result of which execution of all checkpoint restore threads are stopped. If there still remains IO blocks that have not yet been fetched from checkpoint file 155, the flow returns to step 530, where another, unprocessed IO block is selected.

Compression techniques are employed in further embodiments of the invention to reduce the IO bandwidth requirements and the disk space needed to store the state of the VM. The compression techniques according to embodiments of the invention are different from conventional compression techniques in that they are used with lazy checkpointing and in a way that allows the temporal locality of accesses among the pages being written out to be reflected in the checkpoint file.

Figure 6:
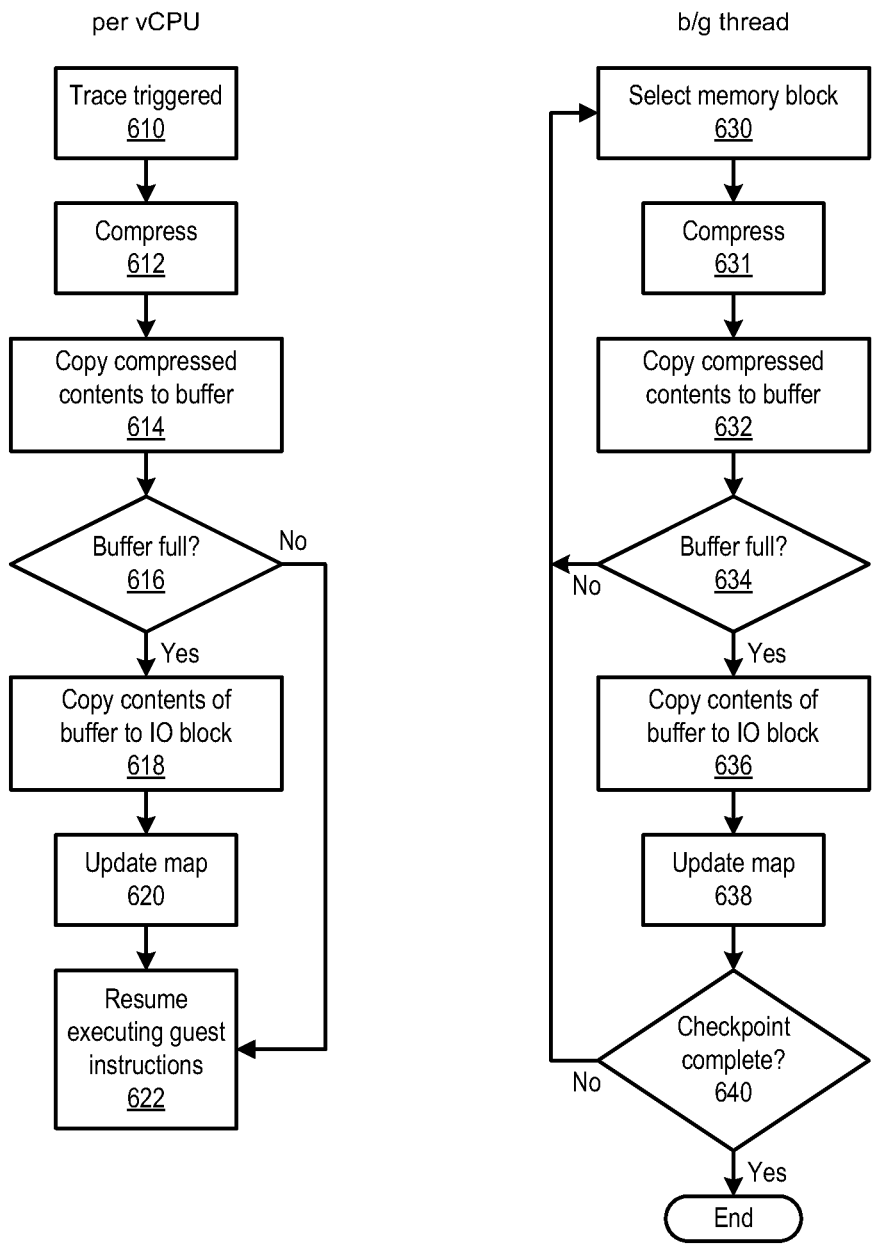
FIG. 6 depicts flow diagrams of processes executed during a checkpoint save process according to another embodiment of the invention.

FIG. 6 depicts flow diagrams that illustrate processes during a lazy checkpoint save process, that allow the memory state to be written out in a compressed form and in an order that captures the temporal locality of the accesses among the pages being written out. These processes replace the processes executed by the vCPU checkpoint save threads and the background threads illustrated in FIG. 4. The main checkpoint thread remains the same.

Each of the vCPUs begins execution of a checkpoint save thread at step 610 when a memory page is accessed (e.g., in connection with a read or write in one embodiment, or a write but not a read in another embodiment) by the corresponding vCPU and the access trace installed on that memory page is triggered. Prior to the access, the memory block containing the memory page to be written is identified and the entire contents of the memory block are compressed (step 612), and the compressed contents are copied into a buffer that has been assigned to the vCPU (step 614). As described above in conjunction with FIG. 3, the buffer contents include a metadata portion, which is populated with the identifier of the memory block compressed at step 612 and the resulting size of the compressed memory block, and a compressed body portion, which contains the compressed contents.

The buffer is checked at step 616 to see if it is full. If it is not, the vCPU at step 622 resumes execution of guest instructions. If the buffer is full, on the other hand, step 618 is executed. At step 618, the contents of the buffer are copied into an IO block of checkpoint file 155. Then, at step 620, memory-IO map 201 is updated with new entries. For example, if contents of memory blocks MB1 and MB2 were compressed and copied in that order into the buffer and then the contents of the buffer were subsequently copied into IO block, DBX, memory-IO map 201 is updated with two new entries: <MB1, offset> and <MB2, offset> (where offset=checkpoint file offset of DBX). IO-memory map 202 is not used in this embodiment. After step 620, the vCPU resumes execution of guest instructions (step 622).

In contrast to the checkpoint save threads executed by the vCPUs, the background thread does not need to wait for a trigger and may begin right away depending on the load of the physical machine hosting the VM. At step 630, background thread selects a memory block to be saved into checkpoint file 155. The same selection technique employed in step 430 may be used here. Then, the entire contents of the selected memory block are compressed (step 631) and the compressed contents are copied into the buffer reserved for this background thread (step 632). As described above, the buffer contents include a metadata portion, which is populated with the identifier of the memory block compressed at step 631 and the resulting size of the compressed memory block, and a compressed body portion, which contains the compressed contents.

The buffer is checked at step 634 to see if it is full. If it is not, the flow returns to step 630, where another, unprocessed memory block is selected. If the buffer is full, on the other hand, step 636 is executed. At step 636, the contents of the buffer are copied into an IO block of checkpoint file 155. Then, at step 638, memory-IO map 201 is updated with new entries in the same manner as step 620.

After step 638, the background thread checks to see if the checkpoint save process has completed by checking to see if all memory blocks of the VM have been saved into checkpoint file 155. If so, the main thread is notified, as a result of which execution of all checkpoint save threads are stopped. If there still remains memory blocks of the VM that have not yet been processed, the flow returns to step 630, where another, unprocessed memory block is selected.

Figure 7:
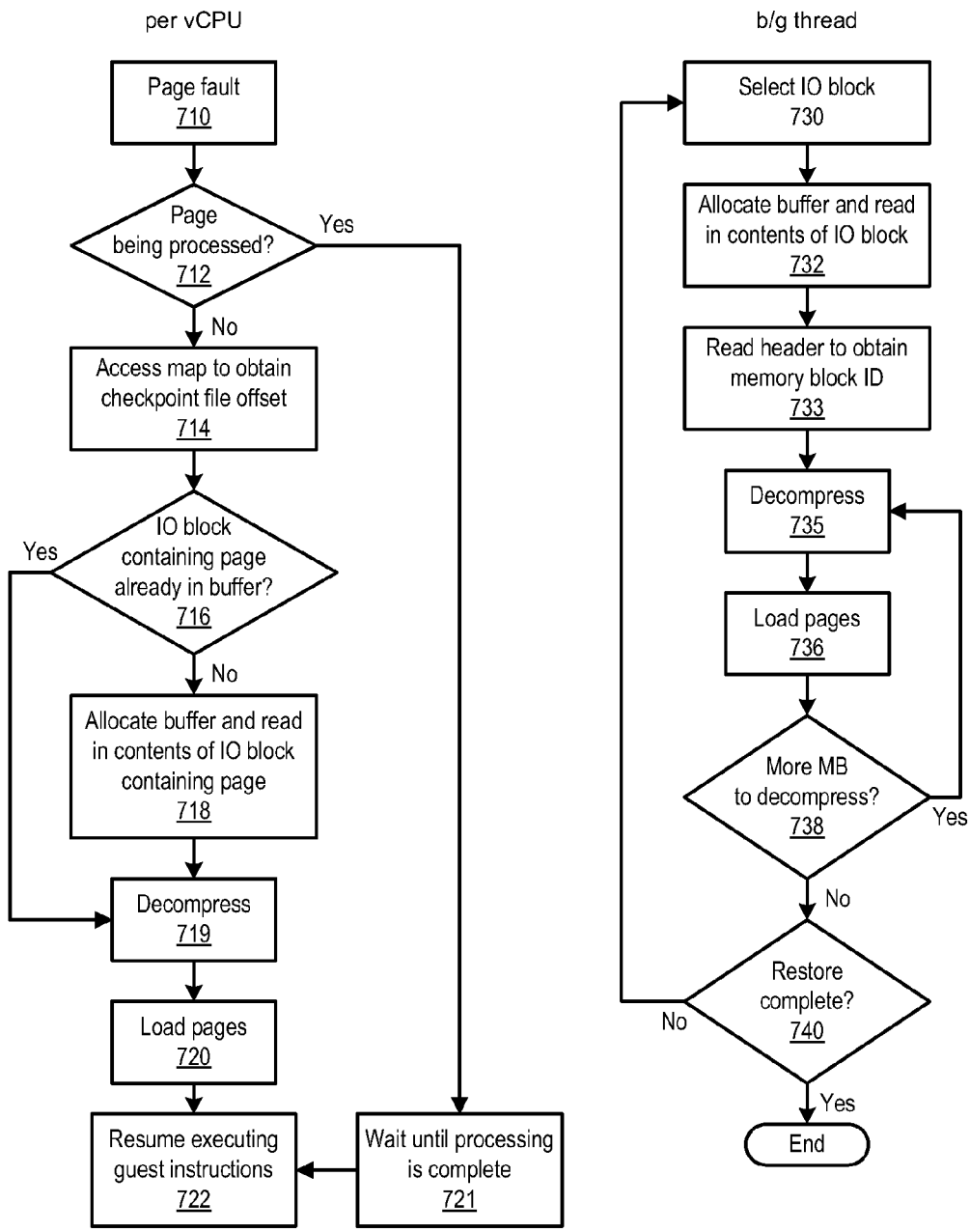
FIG. 7 depicts flow diagrams of processes executed during a checkpoint restore process according to another embodiment of the invention.

FIG. 7 depicts flow diagrams of processes executed during a lazy checkpoint restore process, that allow the memory state saved in a compressed form to be fetched in an order that captures the temporal locality of the accesses among the pages that were written to. These processes replace the processes executed by the vCPU checkpoint restore threads and the background threads illustrated in FIG. 5. The main checkpoint thread remains the same.

Each of the vCPUs begins execution of the checkpoint restore thread at step 710 when a memory page that has not been loaded into VM's physical memory, is accessed by the corresponding vCPU and a page fault is triggered. At step 712, the metadata for buffers 152 is examined to see if the accessed memory page is being processed, e.g., already copied into one of buffers 152 from checkpoint file 155 and being processed by another vCPU thread or background thread for loading into memory. If the memory page is being processed, the vCPU at step 721 waits until the processing of that memory page is complete prior to proceeding to step 722, at which the vCPU resumes executing guest instructions. If the memory page is not being processed, on the other hand, step 714 is executed. At step 714, memory-IO map 201 is accessed to obtain a checkpoint file offset of the IO block associated with a memory block that includes the accessed memory page. At step 716, the metadata for buffers 152 is examined to see if the contents of the IO block have already been copied into one of buffers 152. If the contents of the block have not been copied into one of buffers 152, step 718 is executed, where one of buffers 152 is assigned to the vCPU and the contents of the IO block are copied into this buffer using the offset information stored in memory-IO map 201. Then, the contents of the particular memory block containing the accessed memory page are decompressed and loaded into memory by examining the metadata information stored with the compressed contents in the IO block. For example, if memory-IO map 201 had two entries: <MB1, offset> and <MB2, offset> (where offset=checkpoint file offset of DBX), and a memory page inside MB2 is accessed, the DBX IO block is copied from checkpoint file 155 to the buffer using the checkpoint file offset of DBX. Then, metadata information stored with the compressed contents in the IO block is examined to locate MB2, and the compressed contents of MB2 are read from the buffer for decompression and subsequent loading into the VM's physical memory. In one example, if the memory pages of the memory block, MB2, are mapped to machine pages M1-M8, the decompressed contents are loaded into M1-M8. It should be noted that, after the contents of the particular memory block containing the accessed memory page have been decompressed and loaded into the VM's physical memory, the memory blocks in the buffer not yet processed, may be decompressed and loaded into the VM's physical memory by a background thread. Returning to step 716, if the contents of the IO block have already been copied into one of buffers 152, step 718 is skipped and steps 719 and 720 are executed as described above.

In contrast to the checkpoint restore threads executed by the vCPUs, the background thread does not need to wait for a trigger and may begin right away depending on the load of the physical machine hosting the virtual machine. At step 730, background thread selects an IO block that has not yet been fetched from checkpoint file 155 to be copied into one of buffers 152. The selection of the IO block is made from the first part of checkpoint file 155 for reasons described above. At step 732, one of buffers 152 is assigned from a pool of available buffers and the contents of the selected IO block are copied into this buffer. Then, at step 733, the metadata information of the first compressed memory block is read to identify the memory block and to obtain the size of the compressed memory block. With the size information, the memory block is decompressed at step 735. Then, at step 736, the decompressed memory block is loaded into the VM's physical memory. If there is any compressed memory block remaining in the buffer that is unprocessed, as determined at step 738, steps 735, 736, and 738 are executed for the next compressed memory block.

If it is determined at step 738, that there is no more compressed memory block remaining in the buffer that is unprocessed, the background thread checks to see if the checkpoint restore process has completed by checking to see if all IO blocks have been fetched from checkpoint file 155 and all the memory blocks in buffers 152 have been processed. If so, the main thread is notified, as a result of which execution of all checkpoint restore threads are stopped. If there still remains IO blocks that have not yet been fetched from checkpoint file 155, the flow returns to step 730, where another, unprocessed IO block is selected.

It should be recognized that the background threads employed during the checkpoint processes described herein should run as fast as possible to reduce the time period for lazy checkpointing, but are throttled to avoid IO contention with a VM that may be accessing the same disk. Background threads, e.g., when throttled to avoid IO contention, may be employed to perform compression and/or decompression and to complete the fetching of memory blocks into memory, including any decompression, after the memory blocks have been copied into one or more of buffers 152.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A non-transitory computer-readable medium storing instructions that, when executed by a processor, cause the processor to perform a method of saving a state of a virtual machine running in a physical machine to a checkpoint file that is maintained in persistent storage, the method comprising:
   detecting an access to a memory page of the virtual machine;
   prior to the access, copying contents of a block of memory pages including the memory page into a buffer having a size that is at least two times greater than a size of the block;
   after said copying, determining if the buffer contains a predetermined number of blocks of memory pages of at least two; and
   upon determining that the buffer contains the predetermined number of blocks of memory pages, saving the contents of the blocks of memory pages in the buffer in a storage block of the checkpoint file.

2. The non-transitory computer-readable medium of claim 1, wherein the access is either a read access or a write access.

3. The non-transitory computer-readable medium of claim 1, wherein the access includes a write access but excludes a read access.

4. The non-transitory computer-readable medium of claim 1, wherein the method further comprises:
   updating a first data structure that is maintained in persistent storage that maps each of the blocks of memory pages to a corresponding storage block of the checkpoint file; and
   updating a second data structure that is maintained in persistent storage that maps each storage block of the checkpoint file to at least two blocks of memory pages.

5. The non-transitory computer-readable medium of claim 1, wherein the method further comprises:
   selecting the block of memory pages according to settings of accessed bits in guest pages tables of the virtual machine.

6. The non-transitory computer-readable medium of claim 5, wherein the method further comprises:
   updating a first data structure that is maintained in persistent storage that maps each of the blocks of memory pages to a corresponding storage block of the checkpoint file; and
   updating a second data structure that is maintained in persistent storage that maps the storage block of the checkpoint file to identifiers of the blocks of memory pages.

7. The non-transitory computer-readable medium of claim 5, wherein, during said selecting, a first block of memory pages is selected before a second block of memory pages if the first block of memory pages has a greater number of memory pages that have the accessed bit set than the second block of memory pages.

8. The non-transitory computer-readable medium of claim 5, wherein, the block of memory pages is selected based on the spatial locality of the memory pages of the selected block in the guest page tables relative to the memory pages of a previously selected block.

9. The non-transitory computer-readable medium of claim 5, wherein the method further comprises:
   copying another block of memory pages into another buffer; and then
   determining if said another buffer contains the predetermined number of blocks of memory pages, and upon determining that said another buffer contains the predetermined number of blocks of memory pages, saving the contents of the blocks of memory pages in said another buffer in another storage block of the checkpoint file.

10. The non-transitory computer-readable medium of claim 1, wherein the method further comprises:
    copying another block of memory pages into another buffer; and then
    determining if said another buffer contains the predetermined number of blocks of memory pages, and upon determining that said another buffer contains the predetermined number of blocks of memory pages, saving the contents of the blocks of memory pages in said another buffer in another storage block of the checkpoint file.

11. The non-transitory computer-readable medium of claim 10, wherein the method further comprises:
    selecting another block of memory pages according to a spatial locality of the memory pages of said another block in guest page tables relative to the memory pages of a previously selected block; and
    copying contents of the another block of memory pages into the buffer.

12. The non-transitory computer-readable medium of claim 10, wherein the method further comprises:
    selecting a block of memory pages as said another block of memory pages according to a usage frequency thereof relative to other blocks of memory pages.

13. The non-transitory computer-readable medium of claim 12, wherein said another block of memory pages has a smaller usage frequency thereof relative to other blocks of memory pages that have not been saved in the checkpoint file.

14. A non-transitory computer-readable medium storing instructions that, when executed by a processor, cause the processor to perform a method of saving a state of a virtual machine running in a physical machine to a checkpoint file that is maintained in persistent storage, the method comprising:
    compressing a block of memory pages;
    copying compressed contents of the block of memory pages into a buffer; and
    saving the compressed contents of the block of memory pages in the buffer and metadata information associated with the compressed contents that indicate size of the compressed contents and a unique identifier for the block of memory pages, in a storage block of the checkpoint file.

15. The non-transitory computer-readable medium of claim 14, wherein said saving is performed when the buffer contains compressed contents of a predetermined number of blocks of memory pages of at least two.

16. The non-transitory computer-readable medium of claim 14, wherein the method further comprises:
    updating a first data structure that is maintained in persistent storage that maps each of the blocks of memory pages to a corresponding storage block of the checkpoint file.

17. The non-transitory computer-readable medium of claim 14, wherein the method further comprises:
    compressing another block of memory pages;
    copying compressed contents of said another block of memory pages into another buffer; and
    saving the compressed contents of said another block of memory pages and metadata information associated with the compressed contents that indicate size of the compressed contents and a unique identifier for said another block of memory pages, in said another buffer in another storage block of the checkpoint file.

18. The non-transitory computer-readable medium of claim 14, wherein the method further comprises:
prior to said compressing, selecting the block of memory pages to be compressed.

19. The non-transitory computer-readable medium of claim 18, wherein the method further comprises:
installing access traces on memory pages of the virtual machine; and
detecting an access to a memory page of the virtual machine when the access trace installed on the memory page is triggered,
wherein the memory page with the triggered access trace is selected as the block of memory pages to be compressed.

20. The non-transitory computer-readable medium of claim 18, wherein said selecting is performed according to settings of accessed bits of memory pages in guest pages tables of the virtual machine, and wherein, during said selecting, a first block of memory pages is selected before a second block of memory pages if the first block of memory pages has a greater number of memory pages that have the accessed bit set than the second block of memory pages.

21. A system for saving a state of a virtual machine running in a physical machine to a checkpoint file that is maintained in persistent storage, the system comprising:
a processing unit executing a hypervisor that includes a checkpoint module configured to:
detect an access to a memory page of the virtual machine;
prior to the access, copy contents of a block of memory pages including the memory page into a buffer having a size that is at least two times greater than a size of the block;
after said copying, determine if the buffer contains a predetermined number of blocks of memory pages of at least two; and
upon determining that the buffer contains the predetermined number of blocks of memory pages, save the contents of the blocks of memory pages in the buffer in a storage block of the checkpoint file.

22. A system for saving a state of a virtual machine running in a physical machine to a checkpoint file that is maintained in persistent storage, the system comprising:
a processing unit executing a hypervisor that includes a checkpoint module configured to:
compress a block of memory pages;
copy compressed contents of the block of memory pages into a buffer; and
save the compressed contents of the block of memory pages in the buffer and metadata information associated with the compressed contents that indicate size of the compressed contents and a unique identifier for the block of memory pages, in a storage block of the checkpoint file.

* * * * *